US 6,646,225 B1

(12) United States Patent
Wang et al.

(10) Patent No.: US 6,646,225 B1
(45) Date of Patent: Nov. 11, 2003

(54) METHOD OF JOINING GALVANIZED STEEL PARTS USING LASERS

(75) Inventors: Pei-Chung Wang, Troy, MI (US); Wenkao Hou, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/405,956

(22) Filed: Apr. 2, 2003

(51) Int. Cl.⁷ .................................. B23K 26/20
(52) U.S. Cl. ................................ 219/121.64
(58) Field of Search ............ 219/121.63, 121.64, 219/121.67, 121.72, 121.76, 121.77; 228/165, 166, 170

(56) References Cited

U.S. PATENT DOCUMENTS

| | | | |
|---|---|---|---|
| 4,642,446 A | 2/1987 | Pennington | 219/121 |
| 4,684,779 A | 8/1987 | Berlinger et al. | 219/121 |
| 4,691,093 A | 9/1987 | Banas et al. | 219/121 |
| 4,857,697 A | * 8/1989 | Melville | |
| 5,183,992 A | 2/1993 | Bilge et al. | 219/121.64 |
| 5,187,346 A | 2/1993 | Bilge et al. | 219/121.64 |
| 6,040,549 A | * 3/2000 | Kanaoka | |
| 6,087,619 A | 7/2000 | Berkmanns et al. | 219/121.63 |

FOREIGN PATENT DOCUMENTS

| | | | |
|---|---|---|---|
| JP | 02002160083 A | * | 6/2002 |
| JP | 02002178178 A | * | 6/2002 |

OTHER PUBLICATIONS

Jian Xie, Duel–Beam Laser Welding and its Applications, Sheet Metal Welding Conference IX, 2000, AWS Detroit Section, Sterling Heights, MI.

* cited by examiner

Primary Examiner—Samuel M. Heinrich
(74) Attorney, Agent, or Firm—Kathryn A. Marra

(57) ABSTRACT

This invention provides a method of joining overlapping galvanized steel parts using two lasers for in tandem slot cutting and welding. A first laser beam impacts the steel parts at an energy level sufficient to cut a slot at least through the facing steel part to provide a path for vaporized zinc to escape from a welding interface. Immediately after the first laser beam passes, a second laser beam is directed along the slot at an energy level sufficient to melt ferrous material to fill the slot. After the second laser beams passes, the molten metal is cooled by the surrounding unheated metal to solidify and form a weld nugget.

12 Claims, 1 Drawing Sheet

METHOD OF JOINING GALVANIZED STEEL PARTS USING LASERS

TECHNICAL FIELD

The present invention relates generally to joining zinc-coated metal parts in a low porosity weld. More specifically, this invention pertains to a method of forming a weld between overlapping galvanized steel parts using a first laser to cut a slot through the top part to evaporate zinc at the weld location and a second laser to form the weld in the zinc depleted region.

BACKGROUND OF THE INVENTION

Galvanized steel parts are used in the automotive industry for making auto bodies and other auto components because of their relatively high resistance to corrosion. In these applications, it is often necessary to form a linear weld junction between facing surfaces of two overlapping galvanized steel parts. A high energy laser beam is directed against a surface of one of the parts and along the weld path to momentarily melt a weld slot in the steel through to the interface of the parts. As the beam moves further along the path, previously melted metal loses heat to the adjoining metal and re-solidifies to complete the weld.

The difficulty with using laser beam welding for joining galvanized steel parts, however, is that the relatively low melting point of the zinc coating at the welding interface of the overlapping sheets vaporizes when the steel melt is formed. Some of the zinc vapor is trapped in the re-solidifying iron and the resulting weld nugget is porous and weakened. When there is no escape path for the zinc vapor, the final weld is often porous and unreliable.

Thus, it is an object of the present invention to provide a method of joining zinc-coated steel parts by laser beam welding to produce strong and durable welds with limited weld porosity.

SUMMARY OF THE INVENTION

The present invention provides a method of joining a galvanized steel part to another metal part using laser welding. Often both parts will be galvanized with a coating of zinc and both parts will be sheet metal parts. The parts are held together in an overlapping configuration and at least one layer of zinc coating is present at the welding interface.

The method of the present invention produces a weld between the overlapping parts by directing two laser beams in tandem along a linear welding path. The joining is accomplished by forming one or more welding seams between the overlapping parts. A first laser beam is directed and advanced along the exposed surface of the steel part at an energy level sufficient to pierce or cut a slot therein. The slot is cut to a depth extending through the upper part to a welding interface and, when desired, the welding slot may be cut into and through the bottom part as well. The slot is cut at a width sufficient to permit the zinc vapor generated by the high energy laser beam to escape from the slotted interface of the parts. In some welding situations it may be preferred to assist removal of the zinc vapor from the slot region by the flow of a suitable gas such as nitrogen.

Immediately after the slot has been cut into the steel part, a second laser beam is directed along the slot following the first laser beam. This second laser beam is of sufficient energy and width to melt portions of the metal adjacent the slot. This molten metal flows into the slot and solidifies to constitute the filler metal or weld nugget joining the parts. Since the zinc metal at the weld interface was expelled from the region by action of the first laser the weld nugget is free of pores and constitutes a strong weld.

As an alternative or supplement to using metal next to the slot as weld filler metal, a wire of filler metal (e.g., a steel wire) may be inserted between the second laser beam and the slot to provide a steady melt and flow of welding metal into the slot. Again, after the second laser beam passes over the weld site, the molten material that enters the slot is quenched and solidified by the adjacent part material to form a non-porous weld nugget.

In general, it is preferred that the parts to be joined are supported so that the linear direction of the slot is not vertical. Rather, it is preferred that the tandem laser beams be directed generally downwardly for best management of the removal of the zinc and the refilling of the weld slot with molten metal.

These and other objects and advantages of this invention will become apparent from a detailed description of the preferred embodiment that follows.

DESCRIPTION OF PREFERRED EMBODIMENTS

Figure 1:
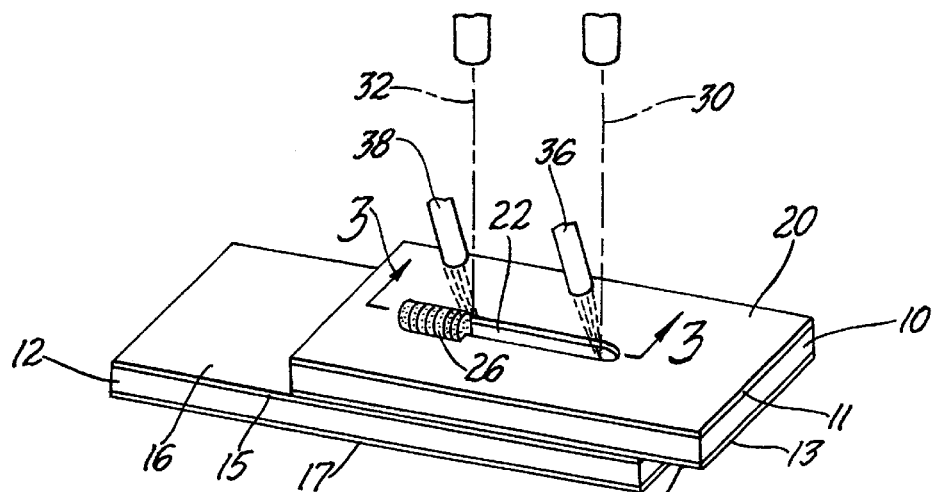
FIG. 1 is a perspective side view showing dual laser beams operating in tandem as they are directed along a welding path on two overlapping steel parts in a first embodiment of the invention.

The present invention provides a combined drilling and welding method using two laser beams that produces a linear seam weld free of zinc vapor produced weld porosity. As shown in FIG. 1, a seam weld 26 is formed between two overlapping steel parts 10, 12. Steel parts 10, 12 for laser welding by this method are typically sheet metal parts about 0.6 to 6 millimeters (mm) in thickness and generally have flat portions for joining. Steel parts 10, 12 also comprise zinc coating layers 11, 13 and zinc coating layers 15, 17, respectively. The thicknesses of zinc coating layers 11, 13, 15, 17, however, are exaggerated in the Figures. In practicing the method of the present invention, at least one of the steel parts is galvanized by well known processes such that it has a zinc coating weight of 30 to 70 grams per square meter ($g/m^2$) of coated surface. Removal of zinc coating layers 13, 15 located at a welding interface 18 (FIG. 3) formed by adjacent surfaces 14, 16 of overlapping parts 10, 12 is necessary to prevent weld porosity from forming in the weld.

FIG. 1 schematically illustrates overlapping parts 10, 12 in close face to face contact. In reality, parts 10, 12 may not be completely flat. But any gap, if present, is not large enough to permit the escape of zinc vapor and may even trap it for release into molten weld filler material. Thus, it is necessary to produce a better escape path for zinc vaporized in the welding process.

In accordance with the present invention, the aforementioned porosity problem is dramatically improved by providing an escape route for zinc vapor generated during the welding operation. Specifically, the method forms a weld nugget 26 between steel parts 10, 12 using two lasers where a first laser beam 30 cuts a slot 22, which provides a suitable path for venting zinc vapor, and a second laser beam 32 produces molten weld filler metal to refill the slot 22 and form the weld 26.

As shown in FIG. 1, a first laser beam 30 is directed on the upper surface 20 (i.e., the surface outboard from the welding surface) of steel part 10 to drill a slot 22. The laser beam 30 is moved relative to surface 20 to cut slot 22 over the path and length of the intended weld seam. A portion of zinc layer 11 in slot 22 is also vaporized as well as the zinc in layers 13, 15. Slot 22 is cut at least completely through the thickness of upper steel part 10 to expose welding interface 18 having zinc layers 13, 15. Since the purpose of slot 22 is to provide an escape route for vaporized zinc from welding interface 18, the depth of slot 22 can suitably extend into, or even through, underlying steel part 12 depending upon the zinc venting requirement of a particular weld setup. The goal is to cut slot 22 to a depth so that zinc vaporized at the weld region can be driven from the site.

While drilling slot 22, laser beam 30 is followed by gas flow tube or line 36. A gas, inert to the welding environment such as nitrogen, flows through line 36 in a stream of sufficient force to carry away zinc vapor and, coincidentally, some molten ferrous material from interface 18 and slot 22. The flow of the carrier gas is indicated in both FIGS. 1 and 3. When slot 22 is cut through both pieces to be joined, the carrier gas may blow the zinc vapor and ferrous material away from interface 18 and out the opposite side to the overlapping pieces 10, 12.

Figure 3:
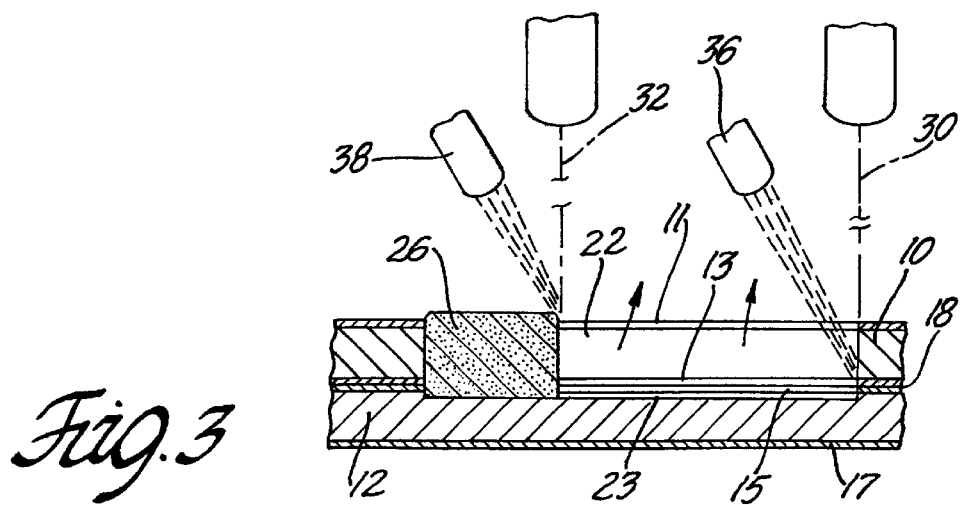
FIG. 3 is a cross-sectional side view along line 3—3 of FIG. 1 showing the escape route of the zinc-containing material from the welding interface and the subsequent formation of the weld.

Thus, laser beam 30 may typically have a power output of about one to four kilowatts. The beam is focused to a size to form a slot of the width of the desired weld seam. The high energy pulse cuts the slot and vaporizes the zinc (having a vaporization temperature of about 900° C.) from the weld interface region 18. It vaporizes zinc in layer 11, 13, 15 where the slot 22 is formed. This energy level should be high enough to vaporize the zinc and drill the slot but low enough to prevent excessive melting of steel beyond the intended slot width. The somewhat simplified or idealized cross-sectional side view of slot 22 in FIG. 3 shows the escape path, indicated by directional arrows, provided for zinc vapor through slot 22 where the bottom 23 of slot 22 extends into sheet 12. The flow of the vapor is assisted by the forceful flow of carrier gas from tube 36. Galvanized layers 11, 13, 15 are still seen at the rear wall of slot 22 but the zinc at weld interface 18 is gone.

After the passage of first laser beam 30, a second laser beam 32 follows in tandem along the same path to produce molten weld filler metal to weld steel parts 10, 12. In the embodiment illustrated in FIG. 1, the second laser beam 32 is directed at the metal surface along one side or both sides of slot 22 at an energy level sufficient to melt the ferrous metal permitting it to flow into and fill slot 22. This energy level is again typically about one to four kilowatts. Specifically, the energy of the concentrated beam of high-energy photons of the laser 32 is converted into heat as these photons encounter the surface 20 of steel part 10, thereby causing the metal to melt at the area surrounding slot 22. Generally, the molten steel will fill up slot 22 to the upper surface 20 of part 10.

After second laser beam 32 passes along the path traced by the first laser and molten steel material from steel part 10 (or parts 10, 12 depending upon the depth of slot 22) has filled slot 22, this molten metal is quenched by its unheated surroundings. The laser melted material quickly solidifies to form weld nugget 26. The height of weld nugget 26 in FIG. 1 is probably exaggerated for illustration. Of course, the paths and operating times of the lasers are controlled to precisely cut and fill the slot to form a desired weld seam pattern. More than one such seam may be required to join an assembly of pieces.

For welding steel parts, high-energy YAG or $CO_2$ lasers are suitable to produce adequate welds. Either of these laser sources provides sufficient energy levels to form narrow, yet durable, welds between thin steel parts. Also in accordance with the present invention, laser beams 30, 32 can be provided by means of two separate laser beam sources or can be generated by splitting a single laser beam formed from a single laser beam source. From an economic stand point, it may be more desirable to split the laser beams and focus and direct them to operate in tandem for use in the present invention.

Figure 2:
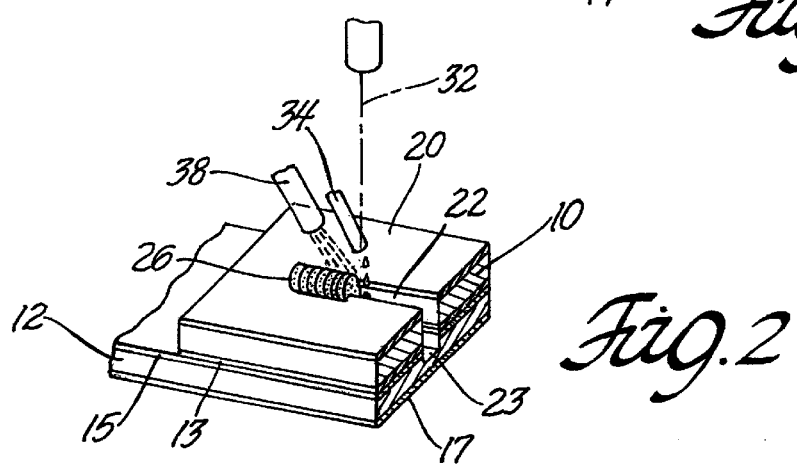
FIG. 2 is a perspective side view showing dual laser beams operating in tandem as they are directed along a welding path on two overlapping steel parts using a welding filler wire in a second embodiment of the invention.

As a common practice in laser welding, a shielding gas is often used to prevent oxidizing substances from the surrounding atmosphere from getting trapped in the weld. These oxidizing substances are impurities in the air that are typically harmful to the integrity of the weld. In operation, the shield gas forms a stream surrounding the laser beam which is directed against the upper surface of the welding region. This gas is provided at suitable flow conditions against the upper surface of the welding region. The downward gas pressure at the surface promotes flow of the molten metal in the weld region to fill the gap. The shielding gas also carries trapped air out of the weld region and prevents its re-entry. In accordance with the present invention, and as shown in FIGS. 1–3, a shielding gas is provided for second laser beam 32 by means of a gas line 38. The shielding gas to be used may be of any gas which is commonly used in laser beam welding such as argon, helium, $CO_2$ or nitrogen.

A second embodiment of the method of the present invention is shown in FIG. 2. The method of this second embodiment is the same as the first embodiment shown in FIG. 1 except that a welding metal filler wire 34 is periodically inserted into the beam 32 of the second laser. The filler wire 34 supplies welding material (or supplemental material) for the weld nugget 26. Specifically, the filler wire 34, as well as the laser beam 32, follows laser beam 30 along the welding seam. Molten wire material thus drips into slot 22 contributing to the weld material. Again the molten material is rapidly quenched by heat loss to its surroundings and forms weld nugget 26.

The method of the present invention provides a viable means for joining galvanized steel parts using laser technology by forming seam welds having minimal porosity. As such, higher weld quality and durability can be achieved through the joint, thereby making such steel assemblies highly desirable as structural components in automotive body assemblies. Furthermore, the method of joining these galvanized parts utilizes a limited amount of equipment, which greatly contributes to the overall economic advantages of incorporating laser technology in the construction of automotive bodies.

While the invention has been described in terms of a preferred embodiment, it is not intended to be limited to that description, but rather only to the extent of the following claims.

What is claimed is:

1. A method of welding a steel sheet metal part having a zinc galvanized coating to a second sheet metal part where said parts are held together in overlapping configuration and zinc coating material is present at a welding interface of said overlapping parts, said method comprising:

directing a first laser beam on a surface of said steel part and advancing said first laser along said surface to cut a slot through said steel part, at least to the depth of said steel part's interface with said second part, in a path for a welding seam, the energy of said first laser and the depth and width of said slot being sufficient to evaporate zinc from said interface through said slot;

directing a second laser beam along said slot following said first laser beam, said second laser beam having sufficient energy to melt ferrous metal into said slot for said weld; and cooling the molten metal to complete said weld.

2. The method as recited in claim 1 in which said second sheet metal part is a zinc galvanized steel sheet metal part.

3. The method as recited in claim 1 comprising using said second laser beam to melt portions of said first steel part adjacent said slot and causing the molten ferrous material to flow into said slot for weld nugget material.

4. The method as recited in claim 1 comprising melting portions of a ferrous metal wire in said second laser beam and causing the molten ferrous metal to flow into said slot for weld nugget material.

5. The method as recited in claim 1 comprising cutting said slot through the thicknesses of both said overlapping parts.

6. The method as recited in claim 2 comprising cutting said slot through the thicknesses of both of said overlapping parts.

7. The method as recited in claim 1 comprising cutting said slot by operating said first laser beam at an energy level in the range of about one to four kilowatts.

8. The method as recited in claim 1 comprising welding said first and second parts by operating said second laser beam at an energy level of about one to four kilowatts.

9. The method as recited in claim 1 comprising splitting a single laser beam generated from a single laser source to produce said first and second laser beams.

10. The method as recited in claim 1 wherein said first laser beam and said second laser beam are generated from a YAG or $CO_2$ laser beam source.

11. The method as recited in claim 1 comprising flowing a zinc vapor carrier gas into said slot adjacent the location of incidence of said first laser beam, said carrier gas being flowed to facilitate the removal of zinc vapor said slot.

12. The method as recited in claim 1 comprising flowing a welding shielding gas into said slot adjacent the location of incidence of said second laser beam.

* * * * *